United States Patent
Brazina

(10) Patent No.: US 7,484,717 B2
(45) Date of Patent: Feb. 3, 2009

(54) ACCELERATOR PUMP CAP FOR A MOTORCYCLE CARBURETOR

(76) Inventor: Edward A. Brazina, 78 Preston Dr., Branchburg, NJ (US) 08876

( * ) Notice: Subject to any disclaimer, the term of this patent is extended or adjusted under 35 U.S.C. 154(b) by 322 days.

(21) Appl. No.: 11/422,738

(22) Filed: Jun. 7, 2006

(65) Prior Publication Data

US 2006/0208367 A1 Sep. 21, 2006

Related U.S. Application Data

(63) Continuation-in-part of application No. PCT/US2005/038345, filed on Oct. 24, 2005.

(60) Provisional application No. 60/622,461, filed on Oct. 27, 2004.

(51) Int. Cl.
*F02M 7/08* (2006.01)

(52) U.S. Cl. .............. 261/34.2; 261/35; 261/DIG. 19; 261/DIG. 67

(58) Field of Classification Search ............ 261/34.2, 261/35, 69.1, 69.2, DIG. 68, DIG. 19, DIG. 67; 123/198 E
See application file for complete search history.

(56) References Cited

U.S. PATENT DOCUMENTS

| | | | |
|---|---|---|---|
| 2,100,205 A | 11/1937 | Spohr | |
| 2,442,046 A | 5/1948 | Hunt | |
| 2,775,435 A | 12/1956 | Kommer | |
| 4,000,223 A | 12/1976 | Yoshioka et al. | |
| 4,390,480 A | 6/1983 | Noisier | |
| 5,128,071 A | 7/1992 | Smith et al. | |
| 5,554,322 A | 9/1996 | Kobayashi | |
| 6,047,956 A | 4/2000 | Brazina | |
| 6,481,698 B1 | 11/2002 | Calvin et al. | |
| 2006/0208367 A1* | 9/2006 | Brazina | 261/34.2 |

OTHER PUBLICATIONS

Transworld Motocross Magazine, "Boyeson Quick Shot Accelerator Pump Cover Product Report", p. 92, May 2005.

* cited by examiner

Primary Examiner—Richard L Chiesa
(74) Attorney, Agent, or Firm—Howson & Howson LLP

(57) ABSTRACT

An accelerator pump cap for an accelerator pump assembly of a carburetor, such as a motorcycle or ATV carburetor, has a cap body with a base and a sidewall projecting from the base defining a fuel chamber within the cap body beneath an open top. Preferably, one or more ports extend through the sidewall closely-spaced to the open top of the cap body to ensure that any vapor or gas residing within the fuel chamber is flushed out of the fuel chamber through the port or ports when the accelerator pump assembly is actuated to supply fuel to the carburetor. Accelerator pump assemblies and the use of a separate collector ring within an accelerator pump cap are also provided.

20 Claims, 9 Drawing Sheets

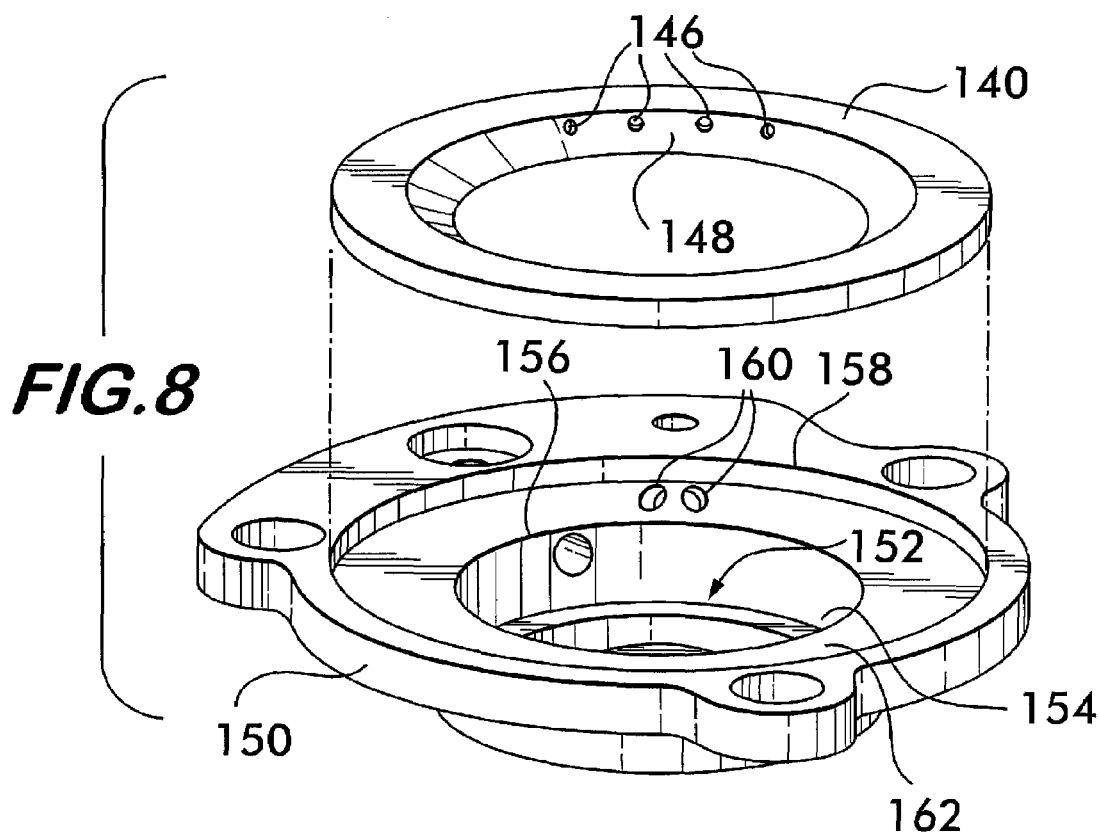
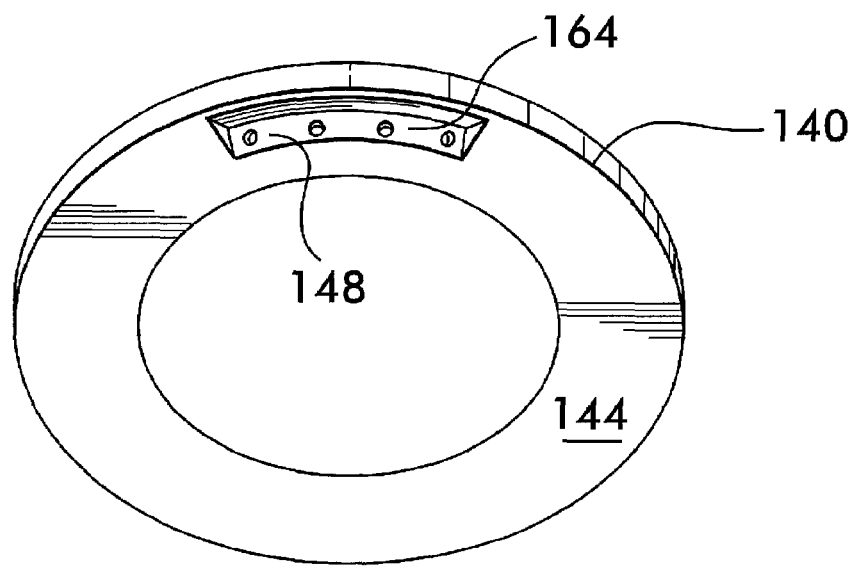

ACCELERATOR PUMP CAP FOR A MOTORCYCLE CARBURETOR

CROSS-REFERENCE TO RELATED APPLICATIONS

This application is a continuation-in-part of co-pending International Patent Application No. PCT/US2005/038345, filed Oct. 24, 2005, which claims the benefit under 35 USC § 119(e) of U.S. Provisional Application No. 60/622,461, filed Oct. 27, 2004.

BACKGROUND OF THE INVENTION

The present invention relates to a carburetor having an accelerator pump, and more particularly, to an accelerator pump assembly including an accelerator pump cap, or cover.

A conventional motorcycle carburetor includes a main body or housing having an induction passage with a throat, or venturi, located intermediate the ends of the induction passage. A butterfly valve assembly or the like is mounted in the manifold end of the induction passage and controls the flow of air therethrough. A fuel bowl is mounted on the bottom of the housing and is connected to the induction passage by a discharge tube. A float located in the fuel bowl controls the level of fuel in a fuel reservoir of the fuel bowl to maintain a ready supply of fuel in the carburetor. When air flows through the throat of the carburetor, fuel is pulled from the fuel reservoir into the air stream in the induction passage of the carburetor due to the difference of pressure created by the air flow.

An increase in fuel flow is required to smoothly accelerate an engine. Typically, when a throttle is opened, airflow will increase immediately. However, an increase in the flow of fuel such as gasolene, which is denser than air, will take time to catch-up with the increased airflow. This results in a lean air-fuel mixture for an initial few moments after a call for acceleration and can cause the engine to hesitate. This problem can be overcome with the use of an accelerator pump which is typically built into the side or bottom of the carburetor. The accelerator pump functions to immediately deliver a spray of fuel to the throat of the induction passage of the carburetor to momentarily increase the fuel-to-air concentration during an initial call for acceleration.

FIG. 1 illustrates an example of a conventional accelerator pump assembly 10 that has a diaphragm 12 seated within a pump cap, or cover, 14. The cap 14 defines a chamber 16 that fills with fuel from a fuel reservoir 18 of the fuel bowl via a normally-opened check-valve 20. When the accelerator pump is actuated, a push rod 22 causes the diaphragm 12 to deflect downwardly thereby pumping fuel in chamber 16 through a normally-closed check-valve 24 through an outlet passage 26 and to a nozzle located in the induction passage of the carburetor downstream of the venturi. Check-valve 20 closes when the diaphragm pumps fuel and opens thereafter to refill chamber 16 with fuel.

A problem experienced with known accelerator pump assemblies is that vapor and gas can collect within the chamber of the pump. The presence and continued collection of vapor within a pump assembly can reduce engine response during start-up and acceleration. For example, when the accelerator pump is actuated, the vapor or gas within the chamber becomes compressed and fuel delivery is delayed.

Thus, there is a need for an accelerator pump that reduces and/or prevents vapor and/or gas collection in the chamber of the pump.

BRIEF SUMMARY OF THE INVENTION

The present invention provides an accelerator pump assembly for a carburetor. The assembly includes an accelerator pump cap having a recess defined by a base and a sidewall of the cap and a diaphragm mounted within on an open end of the cap. A fuel chamber is located within the cap and is defined by the base, sidewall, and diaphragm. The diaphragm is deflectable within the cap to pump fuel residing in the fuel chamber through at least one port at the upper end of the cap adjacent the diaphragm. The location of the port or ports ensures that any vapor or gas within the fuel chamber is flushed through the port or ports every time the diaphragm is deflected into the cap.

According to another aspect of the present application, an accelerator pump cap for an accelerator pump assembly of a carburetor, such as a motorcycle or all-terrain vehicle (ATV) carburetor, is provided. The cap body has a sidewall projecting from a base defining a fuel chamber beneath an open top of the cap body. One or more ports extend through the sidewall and are closely-spaced to the open top of the cap body to ensure that any vapor or gas residing within the fuel chamber is flushed out of the fuel chamber through the port or ports when the accelerator pump assembly is actuated to supply fuel to the carburetor.

In some contemplated embodiments of the present invention, the above referenced port or ports are located on the sidewall entirely within an upper half of the sidewall height, or more preferably, entirely within on an uppermost quarter of the sidewall height. One or more ports in addition to those referenced above, which also extend through the sidewall of the cap body, can be located at or below the above referenced heights.

According to a further aspect of the present invention, a collector ring for use with a carburetor is provided. The carburetor has a fuel bowl and a diaphragm moveable in the fuel bowl to displace fuel and unwanted vapor and gas in a cavity of the fuel bowl through a port in the wall of the fuel bowl. The collector ring is adapted to be installed in the fuel bowl to form with the wall of the fuel bowl a chamber for receiving liquid fuel and unwanted gas and vapor for delivery to the port of the cavity. The collector ring has at least one aperture providing communication between the chamber and the cavity, and the aperture is located closely adjacent the diaphragm when the collector ring is operatively installed in the fuel bowl. Accordingly, displacement of the diaphragm into the fuel bowl causes unwanted gas, fuel vapor, water vapor and the like to be displaced from the cavity through the port.

BRIEF DESCRIPTION OF THE DRAWINGS

The foregoing and other objects, features and advantages of the present invention should become apparent from the following description when taken in conjunction with the accompanying drawings, in which:

FIG. 8 is a perspective view of another alternate embodiment of an accelerator pump cap and collector ring combination according to the present invention;

FIG. 8A is a perspective view of the underside of the collector ring illustrated in FIG. 8;

DETAILED DESCRIPTION OF THE INVENTION

Figure 1:
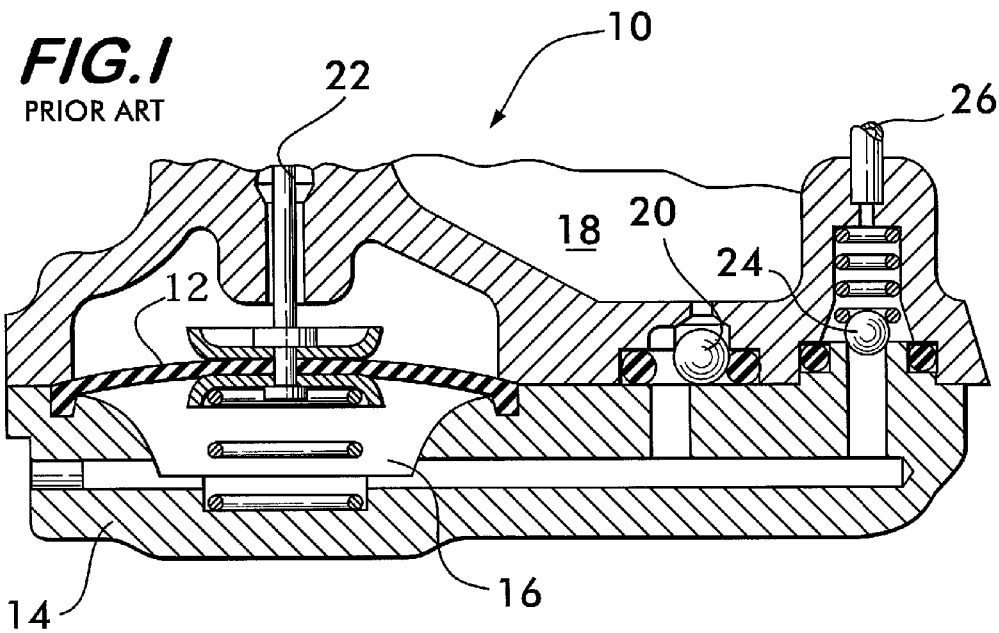
FIG. 1 is a cross-sectional view of an accelerator pump assembly according to the prior art.

Referring now to FIGS. 2, 2A, 4, 4A and 4B, accelerator pump caps, or covers, 30, 30A and 30B according to the present invention are provided for being mounted to a fuel bowl 32 of a carburetor 34, such as a carburetor for a motorcycle or ATV. Each of the caps 30, 30A and 30B has an open recess 36 with a base 38 that preferably has an annular groove 40 formed in a surface thereof. A diaphragm 42 mounts to the top of the open recess 36 of the cap 30 and defines within the cap 30 a fuel pump chamber 44. Preferably, the diaphragm 42 is urged in a normally outwardly-bulged position under the force of a spring or the like which seats within the annular groove 40 of the cap base 38 and projects to the underside of the diaphragm 42.

Figure 4:
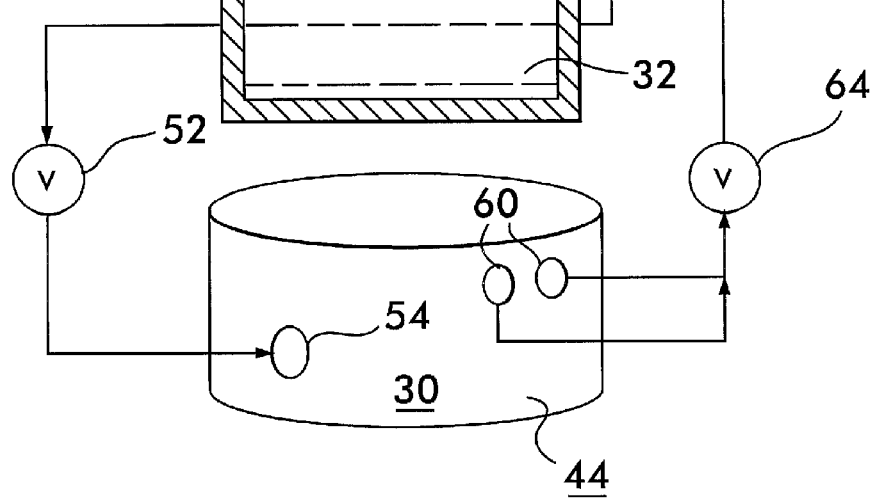
FIG. 4 is a schematic view of a carburetor having an accelerator pump assembly according to the present invention.
Figure 3:
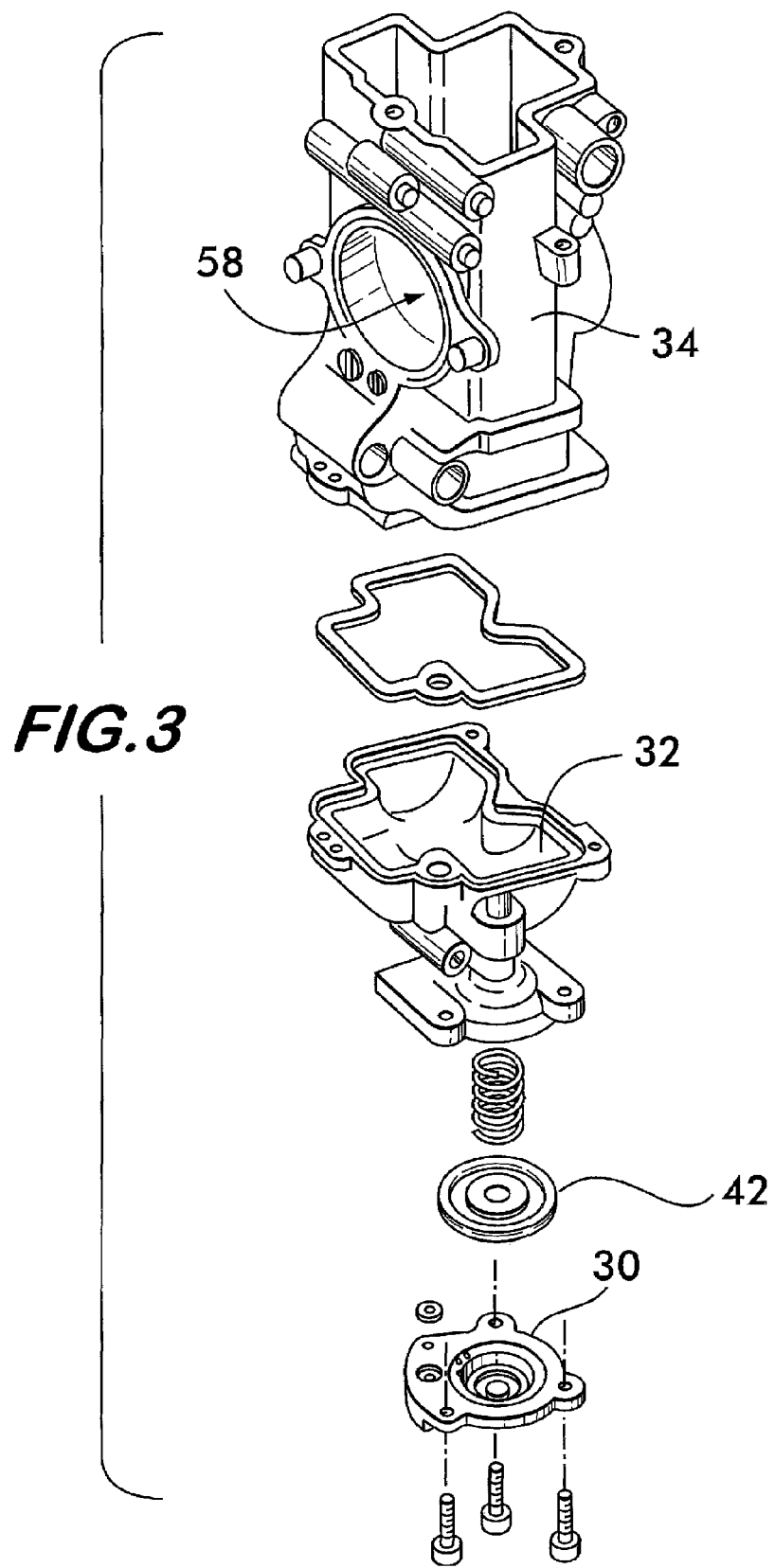
FIG. 3 is an exploded perspective view of a carburetor having an accelerator pump assembly according to the present invention.
Figure 4A:
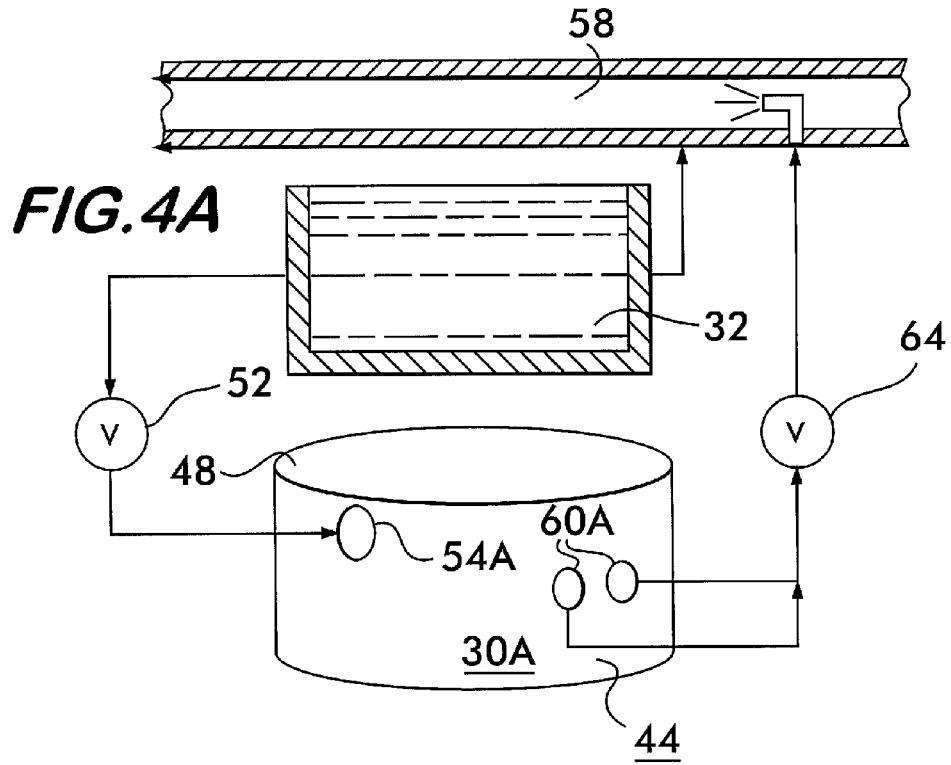
FIG. 4A is a schematic view of a carburetor having an alternate accelerator pump assembly according to the present invention.
Figure 4B:
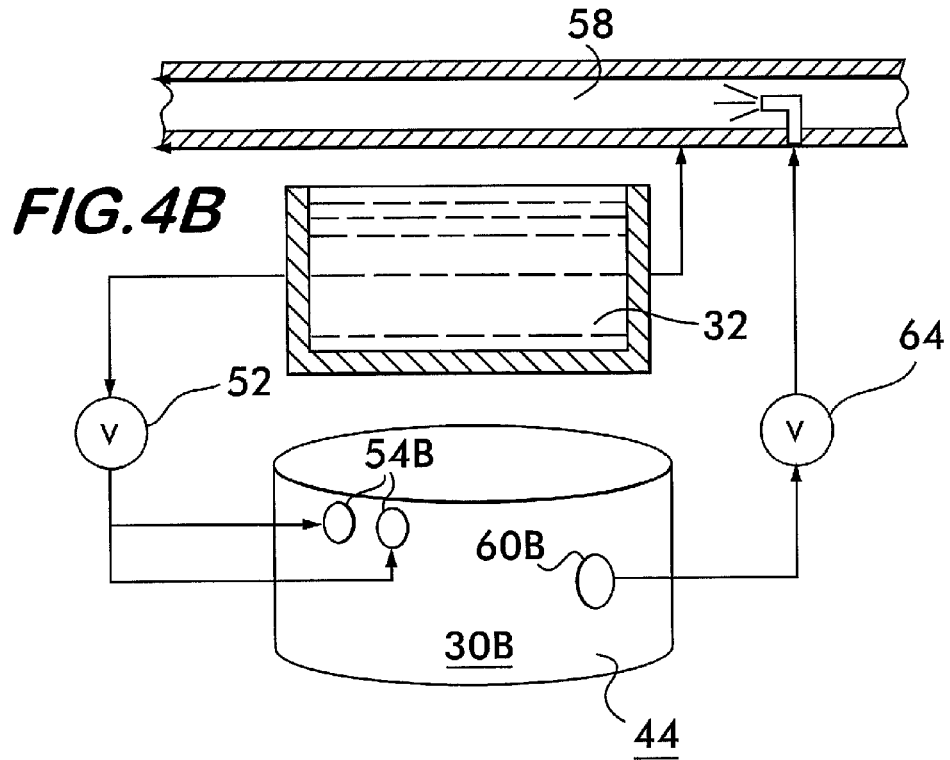
FIG. 4B is a schematic view of a carburetor having an alternate accelerator pump assembly according to the present invention.

Each of the caps has a supply conduit formed therein for providing a path of fuel from a fuel reservoir of the fuel bowl 32 to the fuel pump chamber 44 via a check-valve 52 or the like. See FIGS. 4, 4A and 4B. For example, each cap has an upper rim, or surface, 48 with ports or openings 50 and 62. See FIGS. 2 and 2A. Either of these ports could be arranged to be connected to the fuel bowl 32 to receive fuel therefrom. Thus, fuel can enter the caps via one of ports 50 and 62 and is directed into the fuel pump chamber 44 via either ports 54, 54A or 54B or ports 60, 60A or 60B, which are all formed in a sidewall 56 of the cap recess 36. For purposes of ease of illustration, FIGS. 4, 4A and 4B show ports 54, 54A and 54B as fuel inlets ports; however, this arrangement can readily be reversed so that ports 60, 60A and 60B function as the fuel inlet ports.

A path of fuel pumped from the fuel pump chamber 44 to the induction passage 58 of the carburetor 34 via a check-valve 64 or the like is also provided. This path can be provided via either ports 54, 54A and 54B or ports 60, 60A and 60B to either ports 50 or 62. For example, if fuel enters the fuel pump chambers 44 via ports 50, 54, 54A and 54B, then fuel is pumped to the induction passages 58 via ports 60, 60A, 60B and 62. Alternatively, if fuel enters the fuel pump chambers 44 via ports 60, 60A, 60B and 62, then fuel is pumped to the induction passages 58 via ports 50, 54, 54A and 54B. The direction of flow of fuel into and out of the caps can be arranged, as desired. Accordingly, ports 50, 54, 54A and 54B can be used as inlets or outlets, with ports 60, 60A, 60B and 62 being the opposite.

Figure 2:
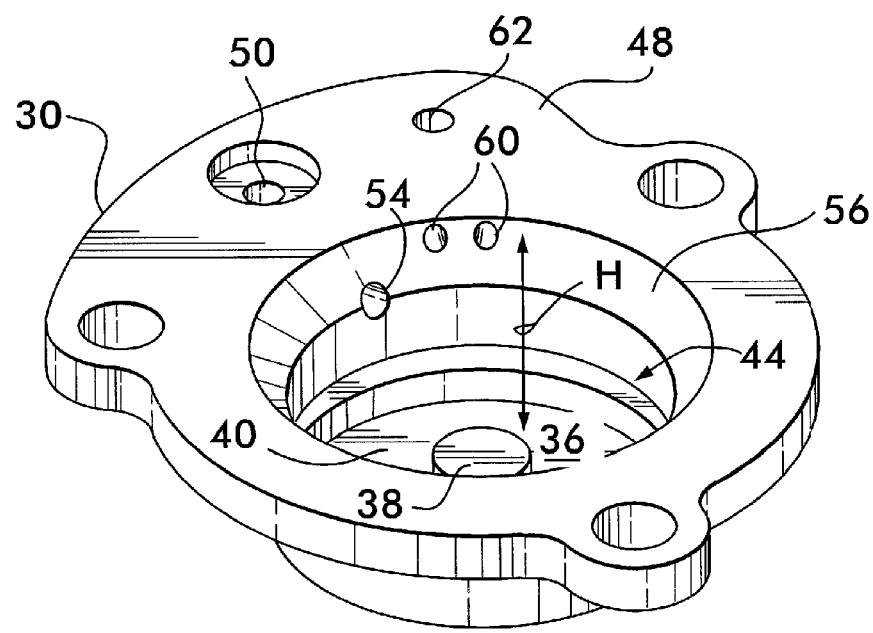
FIG. 2 is a perspective view of an accelerator pump cap according to the present invention.
Figure 2A:
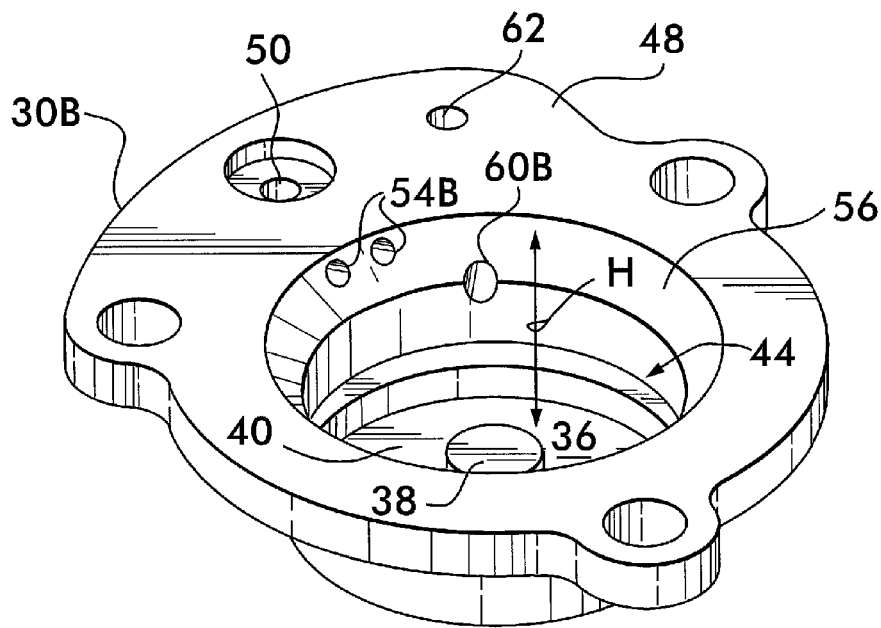
FIG. 2A is a perspective view of an alternate embodiment of an accelerator pump cap according to the present invention.

At least one of the ports 54 and 60 of cap 30 (see FIG. 2) is closely-spaced to the upper surface 48 of the cap 30. Likewise, at least one of the ports 54A and 60A of cap 30A (see FIG. 4A) is closely-spaced to the upper surface 48 of the cap 30A, and at least one of the ports 54B and 60B of cap 30B (see FIG. 2A) is closely-spaced to the upper surface 48 of the cap 30B. For example, ports 60 in FIGS. 2 and 4, 54A in FIG. 4A, and 54B in FIGS. 2A and 4B are located close to the upper surface 48 of the caps. The ports that are closely-spaced to the upper surfaces 48 of the caps are located entirely within an upper half of a height "H" of the sidewalls 56. Height "H" is measured from the base 38 to the upper surface 48 of the caps. Preferably, each port that is closely-spaced to the upper surface 48 is located entirely within an uppermost quarter of the sidewall height "H". Accordingly, the port 60 in FIG. 2 is located at a height on the sidewall 56 that is above the location of the port 54, the port 54A in FIG. 4A is located at a height on the sidewall 56 that is above the location of the port 60A, and the port 54B in FIG. 2A is located at a height on the sidewall 56 that is above the location of port 60B. As an alternative, all ports could be located on the sidewall 56 such that they are closely-spaced to the upper surface 48.

Further, each of ports 54, 54A, 54B, 60, 60A and 60B can be provided as a single relatively-large port or as an array of separate smaller-sized ports which together provide the requisite volume of fuel flow therethrough. For example, the use of a pair of ports are illustrated by ports 60 in FIGS. 2 and 4, 60A in FIG. 4A, and 54B in FIGS. 2A and 4B. The use of an array of smaller-sized ports provides the advantage that flow to and/or from the caps can occur at a highest possible location within the caps to ensure that all vapor and gas is flushed out of the caps when the diaphragm 42 is activated. This is because smaller-sized ports can readily be formed in the caps closer to the upper surfaces 48 of the caps than can a single circular larger-sized port. In addition, the lowermost extent of a single circular larger-sized port will extend closer to the base 38 than that of a smaller-sized port. Preferably, no part of a port that is closely-spaced to the upper surface 48 extends below the upper half, or more preferably the uppermost quarter, of the sidewall height "H".

The ports 54, 54A, 54B, 60, 60A, and 60B are illustrated as being circular or oval shaped openings. However, other opening shapes and number of openings can also be utilized according to the present invention. For example, a single horizontally elongate or oval port can be utilized and/or an array of three or more openings can be utilized. Thus, the shape and/or number of openings can be altered provided that at least some of the openings are located in close proximity to the top of the cap.

Vapor, fuel vapor, water vapor, gases, air and the like may be present within the fuel pump chamber 44 of the caps 30, 30A and 30B and typically collect therein at the top of the cap recess 36 directly underneath the diaphragm 42. According to the present invention, vapor and gas are prevented from collecting and residing long-term within the caps by the use of at least one port, 54, 54A, 54B, 60, 60A, and/or 60B, located adjacent the top of the recess 36. Thus, when the diaphragm 42 is activated to pump fuel, any vapor located within the top of the recess 36 is flushed out of the recess 36 via the at least one port, 54, 54A, 54B, 60, 60A, and/or 60B. Thus, all vapor and gases existing within the cap 30 is flushed out when the accelerator pump is actuated thereby eliminating the long-term presence and collection of vapor and gases within the cap.

For purposes of example, if one of the ports 54, 54A, 54B, 60, 60A, or 60B is closely spaced to the upper surface 48 of the cap and is used as an outlet to direct fuel to the induction passage 58, then any small amount of vapor and gases existing within the cap will be flushed out of the cap every time the diaphragm 42 is actuated.

Alternatively, if one of the ports 54, 54A, 54B, 60, 60A, or 60B is closely spaced to the upper surface 48 of the cap and is used as an inlet to direct fuel into the fuel pump chamber 44 from the fuel bowl 32, then any small amount of vapor and gases existing within the cap will be flushed out of the cap and back into the fuel bowl 32 every time the diaphragm 42 is actuated. This is because the typical check-valve 52 located between the fuel bowl 32 and cap 30, 30A, or 30B does not close instantaneously when the diaphragm 42 is actuated and remains open for a short period of time permitting a small quantity of fuel to flow back into the fuel bowl 32. This short period of time is sufficient to enable any vapor or gases within the cap to be flushed back into the fuel bowl 32 before check-valve 52 actually closes as a result of the diaphragm 42 being actuated. The reasons for why the check-valve 52 permits some flow back into the fuel bowl can be attributed to, for instance, engine vibration, forces exerted during use of the motorcycle, and the requirement of the check-valve 52 to be sufficiently biased in an open position under normal conditions to ensure that the fuel pump chamber 44 fills with fuel. These and other factors tend to delay closing of the check-valve 52. Accordingly, the port or ports closely spaced to the top of the cap can be an inlet or an outlet and will function to remove vapor or gases from the cap regardless of the intended direction of flow through the cap.

During periods of time when the pump is not actuated, fuel is permitted to fill the fuel pump chamber 44 via the check-valve 52 which is connected to the fuel reservoir of the fuel bowl 32. Conversely, the check-valve 64 in the path in which fuel is pumped to the induction passage 58 prevents air from entering the fuel pump chamber and keeps the path full of fuel to provide a ready supply for a responsive discharge upon the next actuation of the pump. See FIGS. 4, 4A and 4B for this arrangement.

When the pump is actuated, the diaphragm 42 extends downwardly into the cap recess 36 thereby forcing fuel through one of ports, 54, 54A, 54B, 60, 60A or 60B, that interconnects to check-valve 64. The actuation of the pump closes check-valve 52 and opens check-valve 64 so that a spray of fuel can be quickly delivered within the induction passage 58 of the carburetor 34. However, as stated above, for a short period of time check-valve 52 remains open and allows a small quantity of fuel to be flushed back into the fuel bowl 32 via the check-valve 52 before the check-valve 52 ultimately closes. Since at least one of the inlet or outlet ports, 54, 54A, 54B, 60, 60A and 60B, is located close to the top of the cap recess 36, any vapor or gas within the fuel pump chamber 44 is flushed out of chamber 44 when the diaphragm 42 is actuated. Thereafter, the fuel pump chamber 44 is re-fills with fuel when check-valve 52 re-opens.

Figure 5:
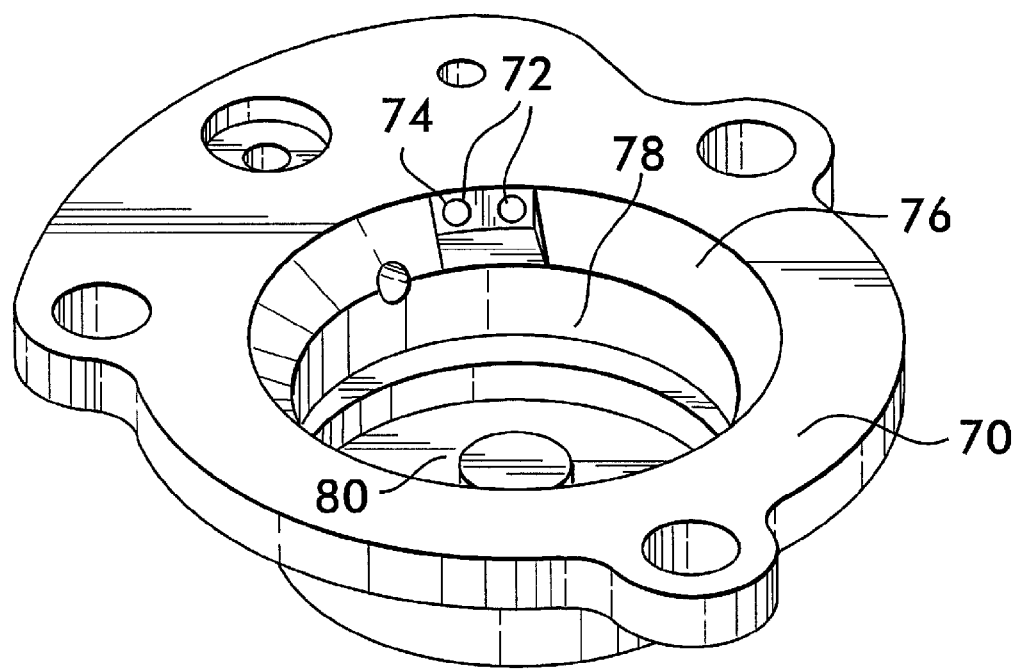
FIG. 5 is a perspective view of an alternate embodiment of an accelerator pump cap according to the present invention.

An alternate embodiment of an accelerator pump cap 70 is illustrated in FIG. 5. The cap 70 is substantially identical to cap 30, except that the ports 72 in cap 70 are formed through a wall portion 74 cut into a sloped annular section 76 of the sidewall 78 of the cap 70. The wall portion 74 is oriented substantially perpendicular to the base 80 of the cap 70.

Figure 6:
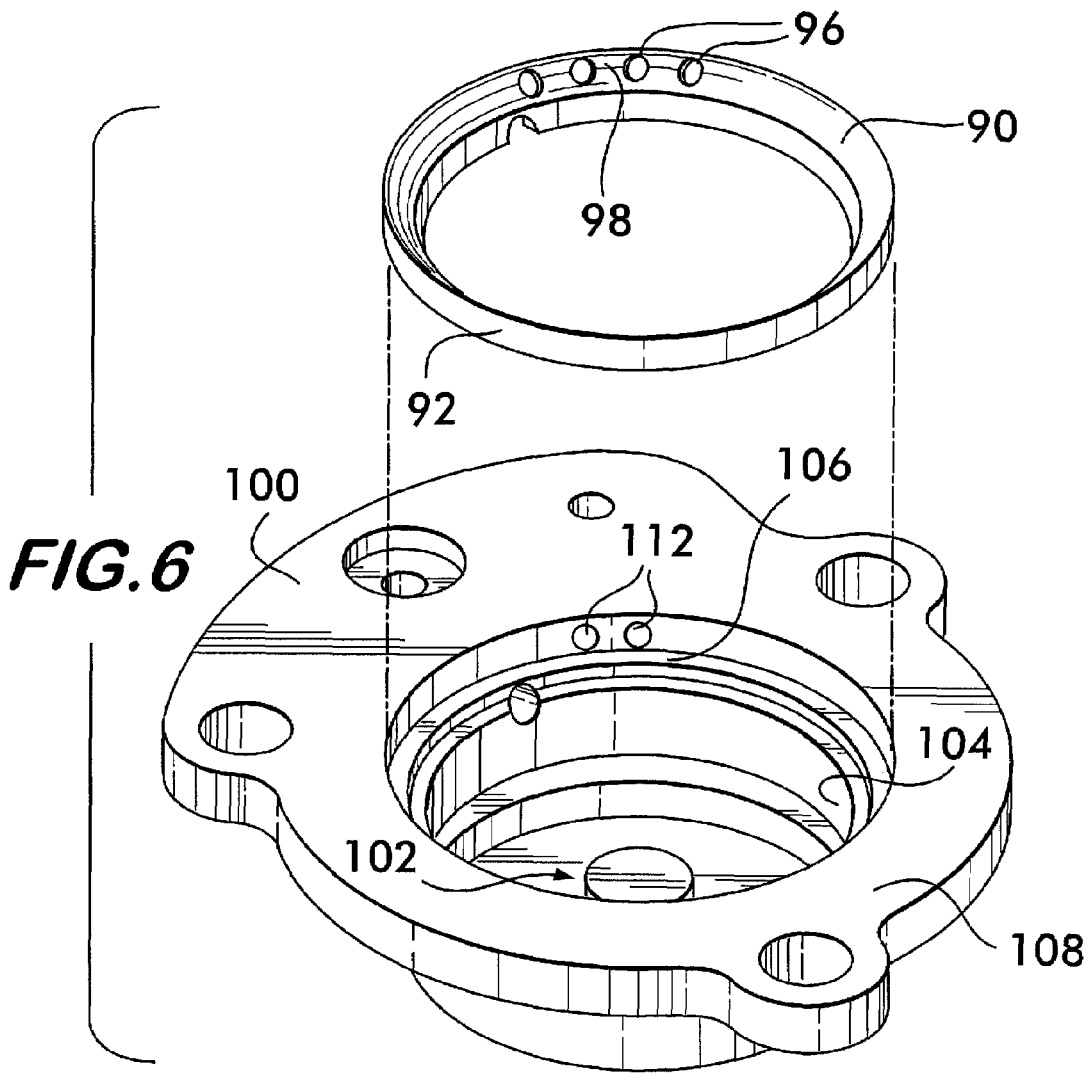
FIG. 6 is a perspective view of a combination of an accelerator pump cap and collector ring according to the present invention.
Figure 6A:
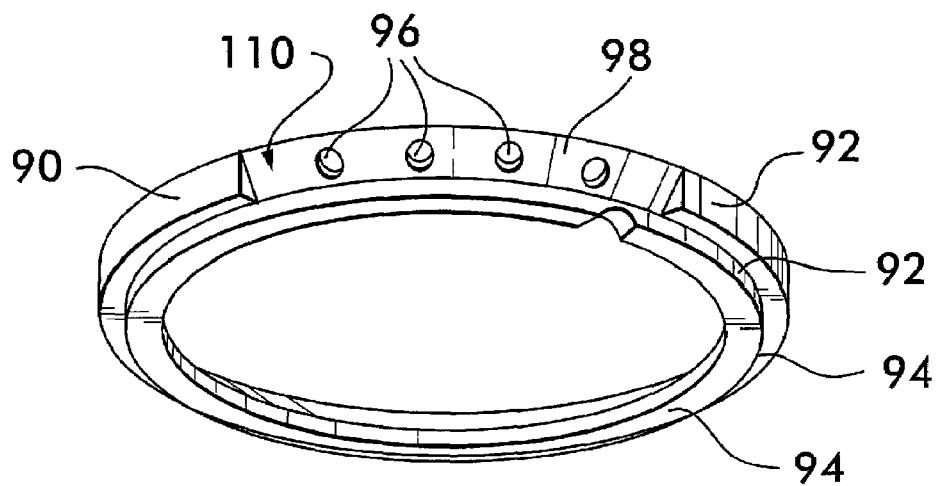
FIG. 6A is a perspective view of the underside of the collector ring illustrated in FIG. 6.

FIGS. 6 and 6A show an alternate embodiment of the present invention which utilizes a separate collector ring 90 installed within the fuel chamber, or cavity, 102 of an accelerator pump cap 100. The cap 100 is substantially identical to cap 30, discussed above, except that annular sidewall 104 of the cap 100 has a stepped profile 106 adjacent the upper end 108 of the cap 100. The outer peripheral sides 92 and underside surfaces 94 of the collector ring 90 substantially match the stepped profile 106 of the cap 100 so that the ring 90 can be seated on the stepped profile 106 within the cavity 102.

The collector ring 90 has an array of apertures 96 extending through a thin-walled portion 98 of the ring 90 that forms a chamber 110 with the sidewall 104 of the cap 100. The chamber 110 is formed at the location of ports 112 of the cap 100 so that the chamber 110 communicates with the ports 112 and so that any fuel, vapor, or gases forced out of the cavity 102 through the ports 112 must pass through the chamber 110. As best illustrated in FIG. 6, the ring 90 seats within the cap 100 adjacent the upper end 108 of the cap 100 thereby positioning the array of apertures 96 close to the upper end 108 of the cap 100 and close to the surface of a diaphragm which deflects into the cavity 102 to force fuel through the ports 112. Accordingly, every time the diaphragm is activated, substantially all vapor and gas will be flushed through the ports 112 and will be prevented from collecting and residing within the cavity 102.

Figure 7:
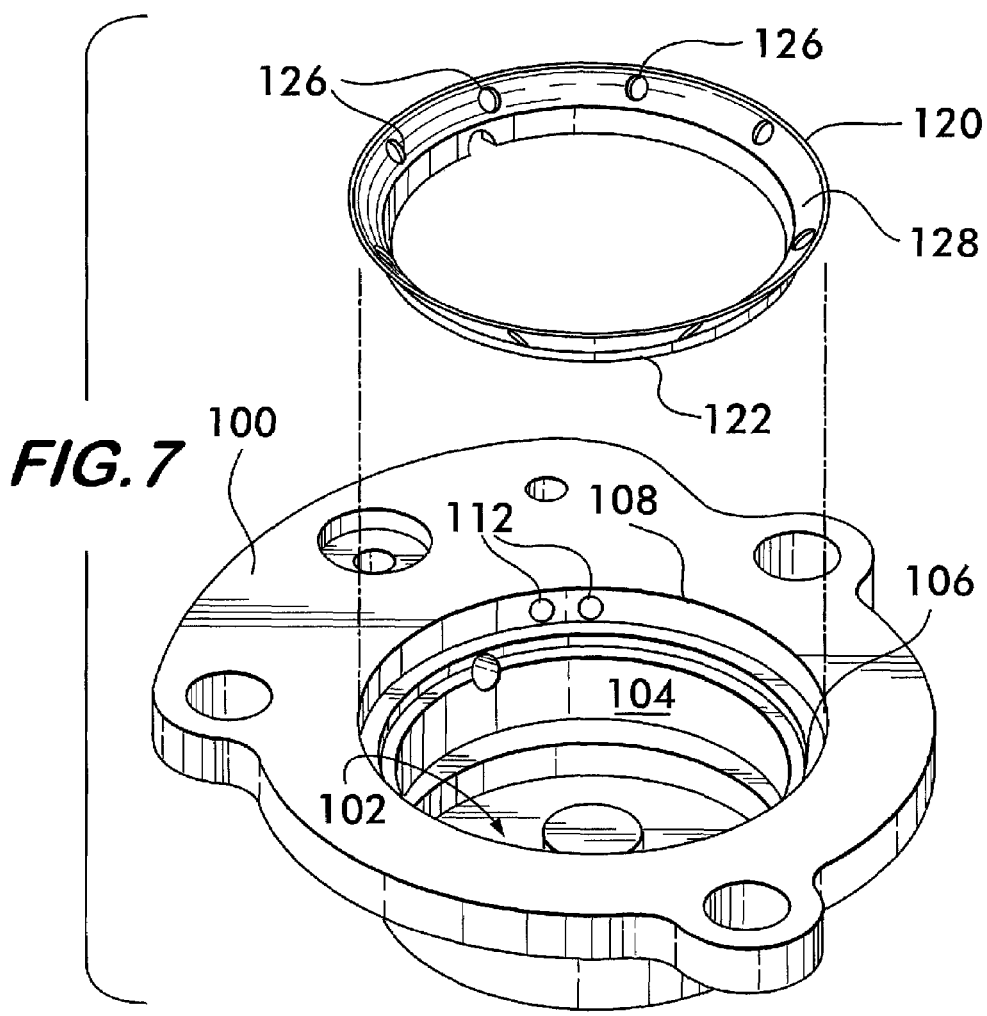
FIG. 7 is a perspective view of an alternate embodiment of an accelerator pump cap and collector ring combination according to the present invention.
Figure 7A:
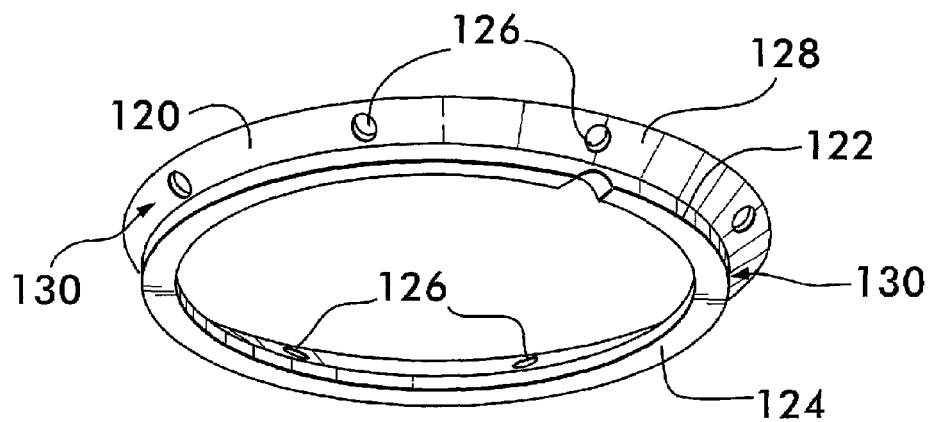
FIG. 7A is a perspective view of the underside of the collector ring illustrated in FIG. 7.

FIGS. 7 and 7A show an alternate embodiment of a collector ring 120 installed within the fuel chamber, or cavity, 102 of the accelerator pump cap 100, discussed above. The collector ring 120 has outer peripheral surfaces 122 and underside surfaces 124 that enable the ring 120 to be received and seated on the stepped profile 106 of the cap 100. The ring 120 also has a spaced array of apertures 126 extending 360° about an upper annular wall 128 of the ring 120 that forms an annular chamber 130 with the sidewall 104 of the cap 100. The chamber 130 is formed at the location of ports 112 of the cap 100 so that the chamber communicates with the ports 112 and any fuel, vapor, or gases forced out of the cavity 102 through the ports 112 pass through the chamber 130.

FIGS. 8 and 8A show another alternate embodiment of the present invention which utilizes a separate collector ring 140 installed within a fuel cavity 152 of an accelerator pump cap 150. The cap 150 is substantially identical to the cap 30, discussed above, except that annular sidewall 154 of the cap 150 has a stepped profile 156 adjacent the upper end 158 of the cap 150. The ports 160 of the cap 150 are located on surface 162 of the stepped profile 156. The underside 144 of the collector ring 140 seats on the surface 162 within the cavity 152.

The collector ring 140 has an array of apertures 146 in a recessed portion 148 of the ring 140 that forms a chamber 164 with the surface 162 of the cap 150. The chamber 164 is formed directly over the ports 160 of the cap 150 so that the chamber 164 communicates with the outlet ports 160. As best illustrated in FIG. 8, the ring 140 seats within the cap 150 adjacent the upper end 158 of the cap 150 thereby positioning the array of apertures 146 close to the upper end 158 and close to the diaphragm which deflects into the cavity 152 to force fuel through the ports 160.

Figure 9:
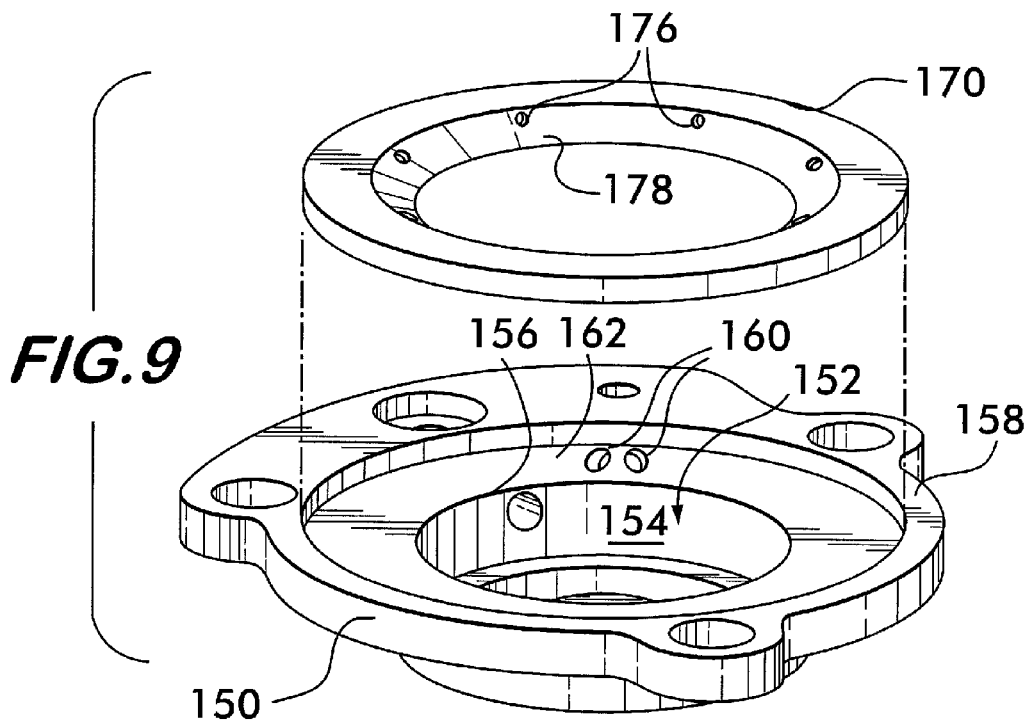
FIG. 9 is a perspective view of yet another alternate embodiment of an accelerator pump cap and collector ring combination according to the present invention.
Figure 9A:
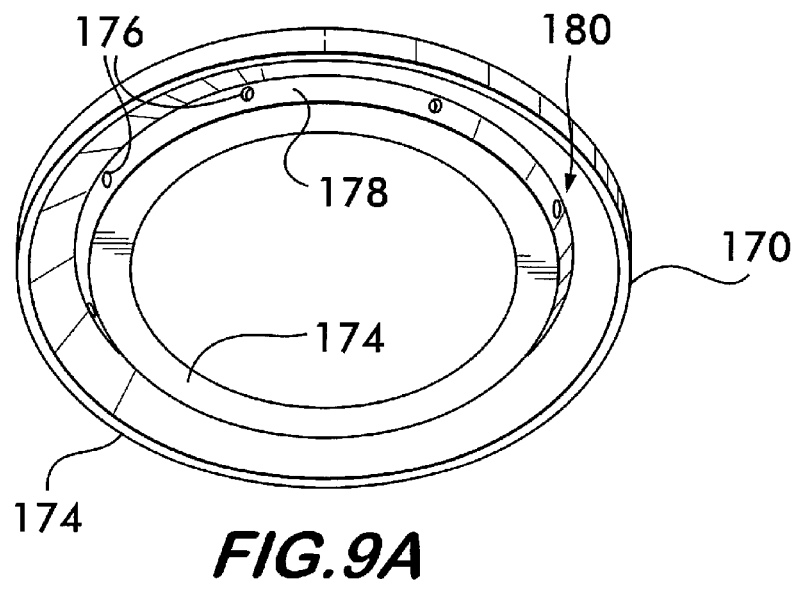
FIG. 9A is a perspective view of the underside of the collector ring illustrated in FIG. 9.

FIGS. 9 and 9A show yet another alternate embodiment of a collector ring 170 installed within the fuel chamber, or cavity, 152 of the accelerator pump cap 150, described above. The collector ring 170 has an underside 174 that seats on the surface 162 of the cap 150. The ring 170 has a spaced array of apertures 176 extending 360° about an upper annular wall 178 of the ring 170 that forms an annular chamber 180 with the sidewall 154 of the cap 150. The annular chamber 180 is formed directly above and in communication with the ports 160 of the cap 150. Thus, any fuel, vapor, or gases forced out of the cavity 152 through the ports 160 must pass through the chamber 180.

While preferred accelerator pump assemblies, caps and collector rings have been described in detail, various modifications, alterations, and changes may be made without departing from the spirit and scope of the accelerator pump assemblies, caps and collector rings according to the present invention as defined in the appended claims.

The invention claimed is:

1. A carburetor having an accelerator pump assembly, comprising:
    a carburetor body having an induction passage;
    a fuel bowl mounted on a bottom of said carburetor body;
    an accelerator pump cap mounted exteriorly on an underside of said fuel bowl with fasteners and being removable therefrom without requiring disassembly of said carburetor body and fuel bowl, said cap having a recess defined by a base, a sidewall and an open upper end of said cap;
    a diaphragm mounted on said upper end of said cap and being deflectable downward within said recess; and
    a fuel chamber located within said cap underneath said diaphragm and defined by said base, sidewall and underside of said diaphragm, said fuel chamber communicating only to a pair of pathways that each extend within the sidewall of said cap to openings on an upper surface of said cap, said pathways including a first fuel supply conduit providing the only path for fuel from said fuel bowl into said fuel chamber and a second fuel supply conduit providing the only path for fuel from said fuel chamber to said induction passage;
    said cap having at least one fixed, stationary port formed in said sidewall adjacent said upper end of said cap to ensure that any vapor, including fuel vapor, air and water vapor, within said chamber is flushed through said at least one port when said diaphragm is deflected downward into said cap.

2. A carburetor having an accelerator pump assembly according to claim 1, wherein said at least one fixed, stationary port located adjacent said upper end of said cap comprises at least two fixed, stationary ports that are formed in said sidewall and that are located side-by-side equally-spaced from said upper end of said cap.

3. A carburetor having an accelerator pump assembly according to claim 2, wherein each of said fixed, stationary ports opens into the same one of said pair of pathways.

4. A carburetor having an accelerator pump assembly according to claim 2, wherein said sidewall of said cap has a predetermined height measured from said base to said upper surface of said cap, and wherein each of said ports are located on an upper half of said sidewall height.

5. A carburetor having an accelerator pump assembly according to claim 4, wherein each of said ports are located on an uppermost quarter of said sidewall height.

6. A carburetor having an accelerator pump assembly according to claim 1, wherein said at least one port extends entirely within an uppermost quarter of a height of said sidewall.

7. A carburetor having an accelerator pump assembly according to claim 6, further comprising an additional port extending through said sidewall of said cap, wherein said at least one port is located closer to said upper end of said cap than said additional port, and wherein one of said at least one port and additional port forms part of said first fuel supply and wherein the other of said at least one port and additional port forms part of said second fuel supply conduit.

8. A carburetor having an accelerator pump assembly according to claim 7, wherein said at least one port comprises at least a pair of ports that are each smaller in size than said additional port and that are located side-by-side equally-spaced from said upper end of said cap.

9. A carburetor having an accelerator pump assembly according to claim 1, further comprising a collector ring in which said at least one port is formed.

10. A carburetor having an accelerator pump assembly according to claim 9, wherein said collector ring is installed in said recess of said accelerator pump cap to form with said sidewall of said accelerator pump cap a second chamber, said collector ring having at least one aperture providing communication between said fuel chamber and said second chamber, said aperture being located closely adjacent said diaphragm when said collector ring is operatively installed in said recess of said accelerator pump cap.

11. An accelerator pump cap for an accelerator pump assembly of a carburetor, comprising:
    a cap body having a base and a sidewall projecting from said base defining a fuel chamber within said cap body beneath an open top in which a diaphragm of the accelerator pump assembly is receivable, said cap body being mountable exteriorly to an underside of a fuel bowl of the carburetor with fasteners and being removable therefrom without requiring disassembly of the carburetor;
    a pair of pathways each extending within the sidewall of said cap to openings on an upper surface of said cap, one of said pathways forming at least a part of a first fuel supply conduit providing the only path for fuel from the fuel bowl into said fuel chamber, and the other of said pathways forming at least a part of a second fuel supply conduit providing the only path for fuel from said fuel chamber to an induction passage of the carburetor; and
    at least one fixed, stationary port extending through said sidewall closely-spaced to said open top of said cap body in constant communication with said fuel chamber to ensure that any gas or vapor within said fuel chamber is flushed out of said fuel chamber and through said at least one port into one of said pair of pathways each time said accelerator pump assembly is actuated.

12. An accelerator pump cap according to claim 11, wherein said at least one port comprises at least a pair of fixed, stationary ports located side-by-side closely and equally-spaced to said top of said cap.

13. An accelerator pump cap according to claim 12, wherein said sidewall has a predetermined height, and wherein said ports are located entirely within an upper half of said sidewall height.

14. An accelerator pump cap according to claim 13, wherein each of said ports is located entirely within an uppermost quarter of said sidewall height.

15. An accelerator pump cap according to claim 11, further comprising an additional port extending through said sidewall of said cap body, said at least one port being located closer to said open top of said cap body than said additional port, and said additional port forming part of the other one of said pair of pathways.

16. An accelerator pump cap according to claim 15, wherein said at least one port comprises at least a pair of ports that are each smaller in size than said additional port and that are located side-by-side equally-spaced from said top of said cap.

17. An accelerator pump cap according to claim 16, wherein one of said pathways interconnects said pair of ports to one of said openings on said upper surface of said cap body.

18. An accelerator pump cap according to claim 11, further comprising a collector ring located within said fuel chamber to form with said sidewall a second chamber communicating with said at least one port, said collector ring having at least one aperture providing communication between said fuel chamber and said second chamber, and said aperture being located closely adjacent said diaphragm.

19. For use with a carburetor having a fuel bowl with a wall forming a cavity with at least one port and a diaphragm moveable in the fuel bowl, a collector ring adapted to be installed in the fuel bowl to form with the wall of the fuel bowl a chamber for receiving liquid fuel, said collector ring having at least one aperture providing communication between the chamber and the cavity, said aperture being located closely adjacent the diaphragm when said collector ring is operatively installed in the fuel bowl, whereby displacement of the diaphragm into the fuel bowl causes unwanted gas to be displaced from the cavity and through the at least one port.

20. A collector ring according to claim 19, wherein the collector ring has an array of apertures providing communication between the chamber and the cavity and located closely adjacent the diaphragm.

* * * * *